(12) United States Patent
Kimura

(10) Patent No.: US 8,904,300 B2
(45) Date of Patent: Dec. 2, 2014

(54) MANAGING AND DISPLAYING SCHEDULE

(75) Inventor: Yoshinori Kimura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 12/189,279

(22) Filed: Aug. 11, 2008

(65) Prior Publication Data

US 2009/0083644 A1    Mar. 26, 2009

(30) Foreign Application Priority Data

Sep. 20, 2007  (JP) ................................ 2007-244002

(51) Int. Cl.
*G06Q 10/10*    (2012.01)
*G06F 15/02*    (2006.01)
*G06Q 10/06*    (2012.01)

(52) U.S. Cl.
CPC .......... *G06Q 10/109* (2013.01); *G06F 15/0266* (2013.01); *G06Q 10/06314* (2013.01); *G06Q 10/1095* (2013.01); *G06Q 10/1093* (2013.01); *G06Q 10/06311* (2013.01); *Y10S 715/963* (2013.01)
USPC .......................................... 715/764; 715/963

(58) Field of Classification Search
CPC . G06Q 10/109; G06Q 10/06; G06Q 10/1093; G06Q 10/06311; G06Q 10/06314; G06Q 10/1095; G06Q 10/063116; G06F 15/0266; Y10S 715/963
USPC ................................................. 715/751, 764
See application file for complete search history.

(56) References Cited

U.S. PATENT DOCUMENTS

| | | | | | |
|---|---|---|---|---|---|
| 4,418,274 | A | * | 11/1983 | Masillo | 235/85 R |
| 5,307,086 | A | * | 4/1994 | Griffin et al. | 715/808 |
| 5,528,745 | A | * | 6/1996 | King et al. | 715/753 |
| 5,581,920 | A | * | 12/1996 | Hydary | 40/114 |
| 5,621,876 | A | * | 4/1997 | Odam et al. | 715/212 |
| 5,652,901 | A | * | 7/1997 | Slayden et al. | 715/209 |

(Continued)

FOREIGN PATENT DOCUMENTS

| | | | |
|---|---|---|---|
| JP | 11-224238 A | 8/1999 | |
| JP | 2001-005788 A1 | 12/2001 | |
| JP | 2002041736 A * | 2/2002 | ............. G06F 17/60 |
| WO | WO 0189206 A2 * | 11/2001 | ............... H04N 5/44 |

OTHER PUBLICATIONS

"Hourly Placeholders on a Monthly Display;" Feb. 1, 1984; NN84024731; IBM Technical Disclosure Bulletin; vol. 26; Issue 9; pp. 4731-4732.*

(Continued)

*Primary Examiner* — Patrick Riegler
*Assistant Examiner* — Eric Wiener
(74) *Attorney, Agent, or Firm* — David A. Dagg

(57) ABSTRACT

A system including a view creation unit for creating a view for displaying schedule data on at least one of a weekly basis, a monthly basis, and a yearly basis and a view for displaying schedule data on a daily basis; and a display control unit for displaying, on a display unit, a weekly, monthly, or yearly first view created by the view creation unit, displaying, in a position corresponding to a predetermined date in the displayed first view, a daily second view corresponding to the date, and displaying schedule data with respect to the second view in a manner that a display position and displayed time periods are associated with each other.

13 Claims, 12 Drawing Sheets

(56) References Cited

U.S. PATENT DOCUMENTS

| | | | |
|---|---|---|---|
| 5,714,320 A * | 2/1998 | Kool | 435/6.16 |
| 5,745,110 A * | 4/1998 | Ertemalp | 715/764 |
| 5,860,067 A * | 1/1999 | Onda et al. | 705/9 |
| 5,874,965 A * | 2/1999 | Takai et al. | 345/667 |
| 5,936,625 A * | 8/1999 | Kahl et al. | 715/775 |
| 6,034,683 A * | 3/2000 | Mansour et al. | 715/764 |
| 6,380,953 B1 * | 4/2002 | Mizuno | 715/764 |
| 6,466,236 B1 * | 10/2002 | Pivowar et al. | 715/835 |
| 6,686,939 B1 * | 2/2004 | Haynes | 345/156 |
| 6,877,262 B2 * | 4/2005 | Bianco | 40/118 |
| 7,003,737 B2 * | 2/2006 | Chiu et al. | 715/848 |
| 7,111,251 B2 * | 9/2006 | Komai | 715/844 |
| 7,325,198 B2 * | 1/2008 | Adcock et al. | 715/722 |
| 7,571,254 B1 * | 8/2009 | Canova et al. | 709/248 |
| 7,639,254 B2 * | 12/2009 | Takiguchi et al. | 345/428 |
| 7,774,718 B2 * | 8/2010 | Finke-Anlauff et al. | 715/833 |
| 7,945,863 B1 * | 5/2011 | Reid et al. | 715/797 |
| 8,082,518 B2 * | 12/2011 | Flake et al. | 715/786 |
| 2002/0063737 A1 * | 5/2002 | Feig et al. | 345/786 |
| 2003/0016248 A1 * | 1/2003 | Hayes Ubillos | 345/800 |
| 2004/0243942 A1 * | 12/2004 | Cortright | 715/769 |
| 2004/0268270 A1 * | 12/2004 | Hill et al. | 715/963 |
| 2005/0005249 A1 * | 1/2005 | Hill et al. | 715/963 |
| 2005/0076288 A1 * | 4/2005 | Poslinski | 715/500 |
| 2005/0108233 A1 * | 5/2005 | Metsatahti et al. | 707/9 |
| 2005/0144096 A1 * | 6/2005 | Caramanna et al. | 705/30 |
| 2006/0064235 A1 * | 3/2006 | Ishikawa et al. | 701/117 |
| 2006/0095868 A1 * | 5/2006 | Sawada et al. | 715/963 |
| 2006/0114256 A1 * | 6/2006 | Kaminaga | 345/440 |
| 2006/0174214 A1 * | 8/2006 | McKee et al. | 715/802 |
| 2006/0190313 A1 * | 8/2006 | Lu | 705/8 |
| 2006/0236269 A1 * | 10/2006 | Borna | 715/963 |
| 2006/0253475 A1 * | 11/2006 | Stewart et al. | 707/100 |
| 2006/0265660 A1 * | 11/2006 | Hullot et al. | 715/733 |
| 2007/0147178 A1 * | 6/2007 | Masuda et al. | 368/29 |
| 2007/0219874 A1 * | 9/2007 | Toulotte | 705/26 |
| 2008/0141145 A1 * | 6/2008 | Klausmeier | 715/751 |
| 2008/0163117 A1 * | 7/2008 | Machtelinck et al. | 715/822 |
| 2008/0165149 A1 * | 7/2008 | Platzer et al. | 345/173 |
| 2008/0170068 A1 * | 7/2008 | Funaki et al. | 345/419 |
| 2008/0182553 A1 * | 7/2008 | Salkini et al. | 455/408 |
| 2008/0319822 A1 * | 12/2008 | LaJoie et al. | 705/9 |
| 2009/0277054 A1 * | 11/2009 | Neiss | 40/107 |

OTHER PUBLICATIONS

Kissell, Joe; "Take Control of Now Up-to-Date & Contact;" Feb. 2006; Version 1.0.1; TidBITS Electronic Publishing.*

Elliot, K. and Carpendale, S.; "Awareness and Coordination: A Calendar for Families;" Technical Report 2005-791-22; Department of Computer Science, University of Calgary, Calgary, Alberta, Canada; 2005.*

* cited by examiner

| YEAR | MONTH | DAY OF WEEK OF FIRST DAY | LAST DAY | DAY OF WEEK OF LAST DAY |
|---|---|---|---|---|
| ⋮ | ⋮ | ⋮ | ⋮ | ⋮ |
| 2007 | 1 | MON. | 31 | WED. |
| | 2 | TH. | 28 | WED. |
| | 3 | TH. | 31 | SAT. |
| | 4 | SUN. | 30 | MON. |
| ⋮ | ⋮ | ⋮ | ⋮ | ⋮ |

*FIG. 3*

| TITLE | PLACE | START DATE/TIME | END DATE/TIME |
|---|---|---|---|
| PROJECT A MEETING | MEETING ROOM 1 | 07/03/15/1430 | 07/03/15/1530 |
| MEETING B | MEETING ROOM 2 | 07/03/15/1730 | 07/03/15/1830 |
| PROJECT A MEETING | MEETING ROOM 1 | 07/03/22/1430 | 07/03/22/1530 |
| ⋮ | ⋮ | ⋮ | ⋮ |

| SUN. | MON. | TUE. | WED. | THU. | FRI. | SAT. |
|---|---|---|---|---|---|---|
| | | | | 1 PROJECT A MEETING MEETING ROOM 1 | 2 | 3 |
| 4 | 5 | 6 | 7 MEETING MEETING ROOM 4 | 8 | 9 | 17 SATURDAY MAR. 2007 7pm 8pm 9pm 10pm 11pm 12am |
| 18 SUNDAY MAR. 2007 1am 2am 3am 4am 5am 6am 7am | | 13 | 14 | 15 | 16 | |
| 25 | 26 | 27 MEETING C MEETING ROOM 2 | 28 | 29 PROJECT A MEETING MEETING ROOM 1 | 30 | 31 |

MANAGING AND DISPLAYING SCHEDULE

CROSS REFERENCE TO RELATED APPLICATIONS

The present application claims priority from Japanese Application Number 2007-244002, filed in Japan on Sep. 20, 2007, the contents of which are incorporated herein by reference.

FIELD OF THE INVENTION

The present invention relates to an apparatus, a method, and a program product for managing and displaying a schedule. In particular, the invention relates to an apparatus, a method, and a program product for displaying a schedule on a daily basis, a weekly basis, a monthly basis, a yearly basis, or the like.

BACKGROUND OF THE INVENTION

Many of information apparatuses such as personal computers and personal digital assistants (PDAs) are provided with a schedule management function that manages schedules in a manner that the schedules and calendar information are associated with each other and causes a display unit to display the schedules. Such a schedule management function typically causes a display unit of an information apparatus to display schedules, for example, on a daily basis, a weekly basis, or a monthly basis.

The contents of a schedule are displayed in a most detailed manner when the schedule is displayed on a daily basis. On the other hand, as the number of displayable days is increased such as in weekly or monthly display, the positions of schedules such as daily schedules are more easily grasped. However, the display area of each day is reduced in display where more days are displayable; therefore, the contents of each schedule are displayed in a limited manner.

Conventionally, when a user attempts to display a schedule using such a schedule management function, the user has switched among display formats such as daily display, weekly display, monthly display, etc. according to what type of information the user wants to obtain with respect to the schedule. For example, if the user attempts to check the detailed contents of a schedule or edit the schedule, the user has displayed the schedule on a daily basis. If the user attempts to check a calendar or the relations between a schedule and the schedule's prior and subsequent schedules, the user has displayed them on a weekly basis or a monthly basis. However, if the user wants to check, for example, both the detailed contents of a schedule and a calendar, the user has had to take the trouble to switch among display formats.

To address this problem, there have been related art examples that simultaneously display a schedule in different multiple display formats (for example, see Japanese Unexamined Patent Application Publication No. 2001-5788). An apparatus disclosed therein displays a monthly calendar as well as the contents of a schedule on a date selected in the monthly calendar. Thus, the position of the schedule is grasped in the displayed monthly calendar and the detailed contents of the schedule on the selected date are checked in the displayed daily calendar.

SUMMARY OF THE INVENTION

As described above, according to the schedule management function of related art information apparatuses, a schedule is displayed on a daily basis, a weekly basis, a monthly basis, or the like. Therefore, a user switches between display formats so as to display a schedule, according to what type of information the user wants to obtain. Thus, the user has to take the trouble to perform such a switching operation.

Also, according to the technology described in Japanese Unexamined Patent Application Publication No. 2001-5788, both a monthly calendar and the contents of a schedule on a specific date are displayed. In this case, the contents of a schedule on a date selected in the monthly calendar are displayed in a specific area prepared to display the contents of a schedule on a specific date. This eliminates the need to switch between the display formats; however, the user must move his or her point of view to check the monthly calendar and the information regarding the selected date. Therefore, it is difficult for the user to intuitively understand to information regarding which date in the monthly calendar the contents of the displayed schedule correspond.

Accordingly, an object of the present invention is to provide an interface that reduces operations necessary to switch between display formats as well as makes it easy to intuitively grasp information, to the schedule management function of an information apparatus.

To achieve the object, the present invention is realized as the following apparatus. This apparatus includes: view creation means for creating a view for displaying schedule data on at least one of a weekly basis, a monthly basis, and a yearly basis and a view for displaying schedule data on a daily basis; and display control means for causing a display unit to display a weekly, monthly, or yearly first view created by the view creation means, to display, in a position corresponding to a predetermined date in the first view, a daily second view corresponding to the date, and to display schedule data with respect to the second view in a manner that a display position and displayed time periods are associated with each other.

The above-mentioned apparatus preferably further includes reception means for receiving an operation for changing time periods displayed in the second view. The display control means preferably changes a display position of the second view according to a change in the displayed time periods.

If the time periods displayed in the second view extend over multiple dates, the display control means preferably displays the second view so that the second view extends over corresponding multiple dates in the first view according to the ratio of the number of time periods of one of the dates to the number of time periods of the other date in the time periods displayed in the daily view 120.

If the time periods displayed in the second view extend over multiple dates belonging to different weeks, the display control means preferably displays the second view in a position of each of corresponding dates in the first view.

If the time periods displayed in the second view extend over multiple dates belonging to different weeks, the display control means preferably displays, in a position of each of corresponding dates in the first view, the second view including time periods related to a corresponding date of the multiple dates.

The above-mentioned apparatus preferably further includes reception means for receiving an operation for changing a display position of the second view. If the second view is moved, the display control means preferably changes time periods displayed in the second view according to a position of the moved second view.

Also, the present invention is realized by the following method. This method is a method for managing and displaying a schedule using a computer and includes the steps of (a)

causing the computer to display, on a display unit, a first view for displaying a schedule on a weekly, monthly, or yearly basis and to display, in a position corresponding to a predetermined date in the first view, a daily second view corresponding to the date, (b) causing the computer to receive an operation for changing time periods displayed in the second view, and (c) causing the computer to change a display position of the second view according to a change in the displayed time periods.

Further, the present invention is realized as a program for causing a computer to processes corresponding to the steps included in the above-mentioned method or a program for a computer to serve as each means included in the above-mentioned apparatus. This program is provided such as by storing it in a hard disk or optical disk, a semiconductor memory, or other storage media and distributing it, or by distributing it via a network line.

According to the present invention configured as described above, an interface that reduces operations necessary to switch between display formats and makes it easy to intuitively grasp information is provided to the schedule management function of an information apparatus.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 3 is a diagram showing the configuration of calendar data used in this embodiment;

FIG. 4 is a diagram showing the configuration of schedule data used in this embodiment;

FIG. 5 is a diagram showing an aspect in which a daily view is overlaid on a monthly view on the screen of a display unit;

FIG. 9 is a diagram showing a display example in a case where the time periods displayed in the daily view cover multiple dates that belong to different weeks;

FIG. 13 is a diagram showing an aspect in which the monthly view, a weekly view, and the daily view are overlaid in this order and displayed.

DETAILED DESCRIPTION OF EXEMPLARY EMBODIMENTS

An embodiment of the present invention will now be described with reference to the accompanying drawings. This embodiment is applicable to information apparatuses such as a personal computer (PC) and a PDA.

System Configuration

Figure 1:
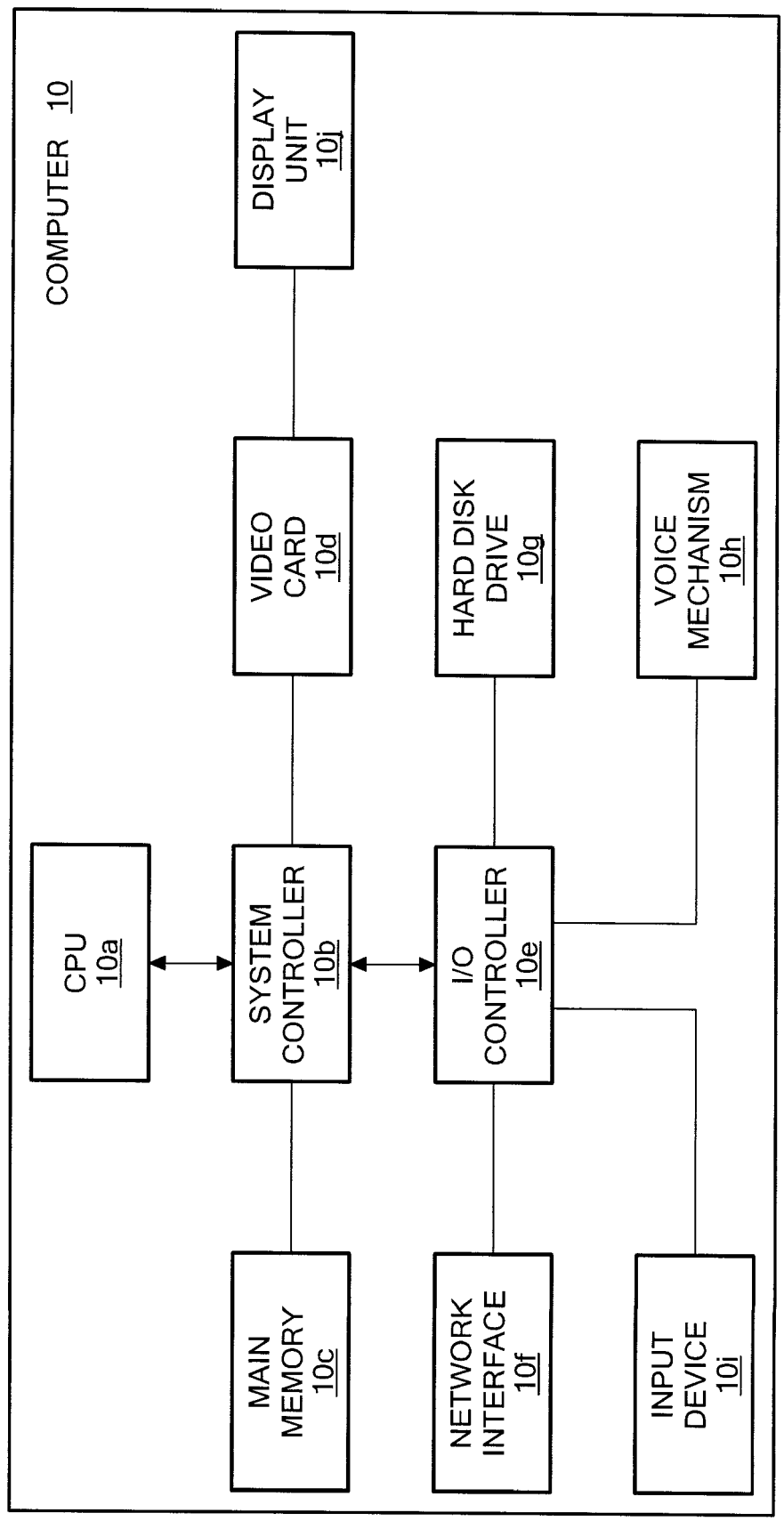
FIG. 1 is a diagram showing an example configuration of a PC to which this embodiment is applicable.

FIG. 1 is a diagram showing an example configuration of a PC to which this embodiment is applicable.

A computer 10 shown in FIG. 1 includes a central processing unit (CPU) 10a serving as computation means, a main memory 10c serving as storage means, and a hard disk drive (HDD) 10g. The computer 10 also includes a network interface 10f for connecting the computer to an external device via network, a video card 10d for producing a display output, a display unit 10j, and a voice mechanism 10h for producing a voice output. Further, the computer 10 includes an input device 10i such as a keyboard or a mouse.

As shown in FIG. 1, the main memory 10c and the video card 10d are coupled to the CPU 10a via a system controller 10b. A network interface 10f, the HDD 10g, the voice mechanism 10h, and the input device 10i are coupled to the system controller 10b via an I/O controller 10e. These components are coupled to one another via various types of buses such as a system bus or an input/output bus. For example, a system bus or a memory bus couples between the CPU 10a and the main memory 10c. An input/output bus, such as peripheral components interconnect (PCI), PCI express, serial AT attachment (ATA), universal serial bus (USB), accelerated graphics port (AGP), couples between the CPU 10a, and the HDD 10g, the network interface 10f, the video card 10d, the voice mechanism 10h, the input device 10i, and the like.

FIG. 1 only illustrates a preferred hardware configuration of a PC to which this embodiment is applicable. Of course, the hardware configuration is not limited to the illustrated one. For example, the PC may include a video memory, instead of the video card 10d, so that image data is processed in the CPU 10a. Also, instead of providing the voice mechanism 10h as an independent component, a chip set included in the system controller 10b or the I/O controller 10e may serve as the voice mechanism 10h. Also, besides the HDD 10g, a drive in which an optical disk or a flexible disk is used as media may be provided as an auxiliary storage device. While a liquid crystal display is typically used as the display unit 10j, an arbitrary type of display such as a cathode ray tube (CRT) display or a plasma display may be used instead. As described above, this embodiment is also applicable to PDAs and the like.

Figure 2:
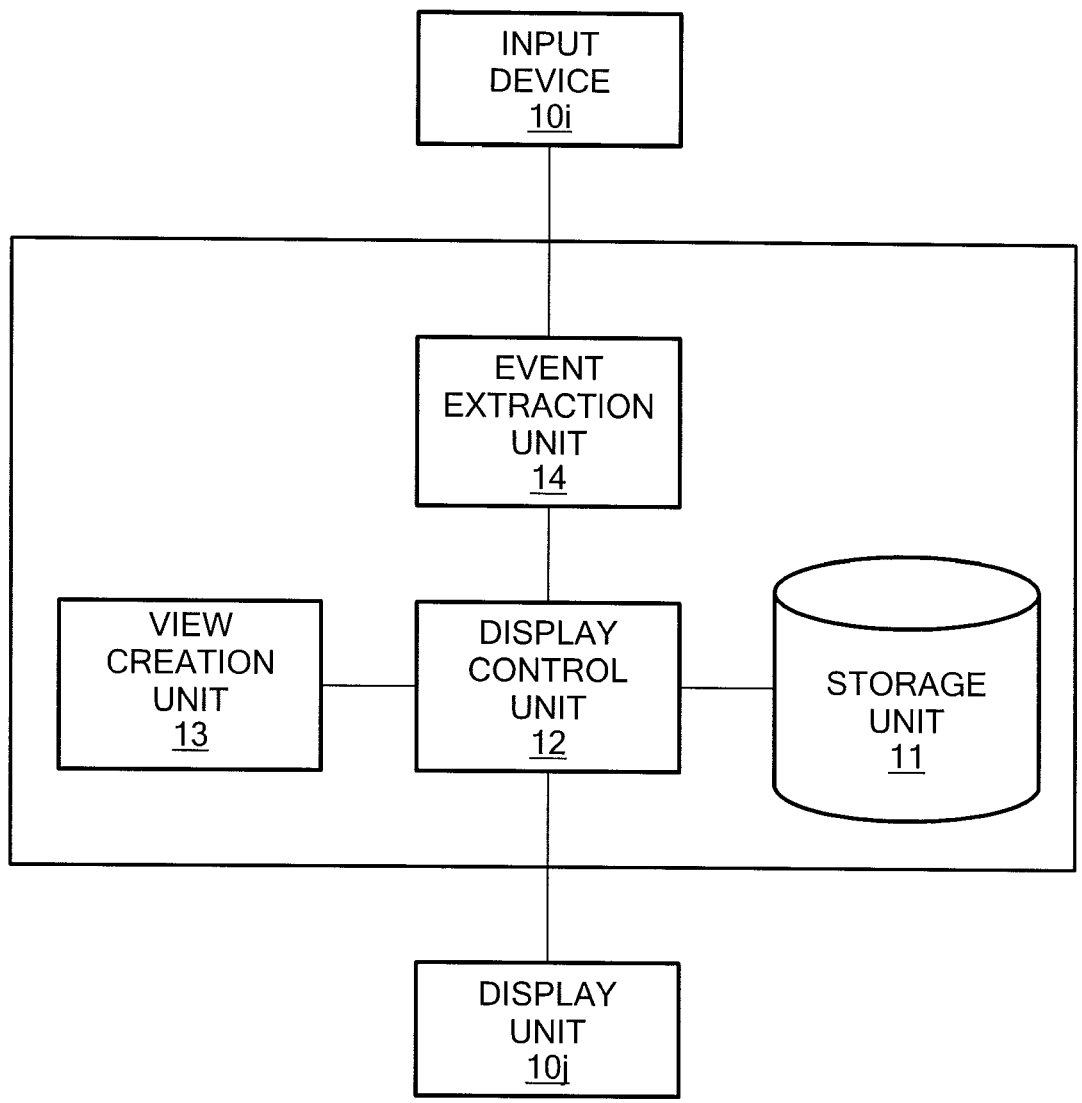
FIG. 2 is a diagram showing the configuration of a schedule management function realized by an embodiment of the present invention.

FIG. 2 is a diagram showing the configuration of a schedule management function realized by this embodiment.

As shown in FIG. 2, the schedule management function according to this embodiment includes a storage unit 11, a display control unit 12, a view creation unit 13, and an event extraction unit 14. For example, if this embodiment is applied to the computer 10 shown in FIG. 1, the storage unit 11 is realized by storage means such as the main memory 10c, the HDD 10g, or the like. The display control unit 12, the view creation unit 12, and the event extraction unit 14 are realized by the CPU 10g that is controlled by a program. For example, the program for controlling the CPU 10a is stored in the HDD 10g, and is read by the main memory 10c and executed by the CPU 10a.

The storage unit 11 stores calendar data that is information on days, weeks, months, years, and the like, and schedule data that is information on schedules. For example, as shown in FIG. 3, the calendar data includes a table in which information such as the months from January to December, the day of the week of the first day of each month, the last day of each month, the day of the week of the last day, and the like is registered by year. For example, as shown in FIG. 4, the schedule data includes a table in which information such as each schedule's title, place, start date/time, end date/time, and the like is registered.

The display control unit 12 is display control means that reads the calendar data and the schedule data stored in the storage unit 11 and controls schedule display according to the read data. For example, the display control unit 12 causes the display unit 10j of the computer 10 to display schedule data in various formats such as on a daily basis or a weekly basis. Once a user has performed a specific operation, the display control unit 12 according to this embodiment causes the display unit 10j to display schedule data with different formats of calendars overlapped, for example, in a manner that a weekly or monthly calendar (a "view" to be discussed later) is overlaid with a daily calendar on a specific date selected in the weekly or monthly calendar. Details of display control performed by the display control unit 12 will be described later.

The view creation unit 13 is view creation means for creating a view (schedule) that includes a calendar and a schedule and is to be displayed on the display unit 10j, according to an instruction from the display control unit 12. A view is displayed in a daily, weekly, monthly, or yearly display format according to an instruction from the display control unit 12. The size of an area in which a schedule is described varies according to the display format of the calendar view. For this reason, the view creation unit 13 reduces or increases the amount of information on the schedule to be described as appropriate. For example, a daily view displays all items of the schedule data, a weekly view displays a part of the items, such as start times and titles, and a monthly view displays only titles. A yearly view does not have an area for displaying the contents of a schedule for each day; therefore, for example, a day with respect to which some schedule is recorded is displayed in a different color so that the user can recognize such a day.

The event extraction unit 14 is reception means that receives an input operation performed by a user, for example, using the input device 10i such as a mouse or a keyboard in the computer 10 so as to extract a specific event. Specifically, the event extraction unit 14 receives an operation such as movement of the cursor (mouse cursor) onto the display field of a specific date (hereafter referred to as a "date field") in the calendar view displayed on the display unit 10j, clicking of the cursor with the cursor resting on a specific date field, or scrolling of a daily or weekly calendar, and then extracts such an operation as an event.

Display Control of View

This embodiment provides an interface that displays a monthly or weekly view and a daily view in a manner that the latter is overlaid on the former so that the contents of a schedule on a specific date and the schedule's position are simultaneously and easily grasped. Using, as an example, a case where a daily view is overlaid on a monthly view, view display control according to this embodiment will now be described.

Figure 5:
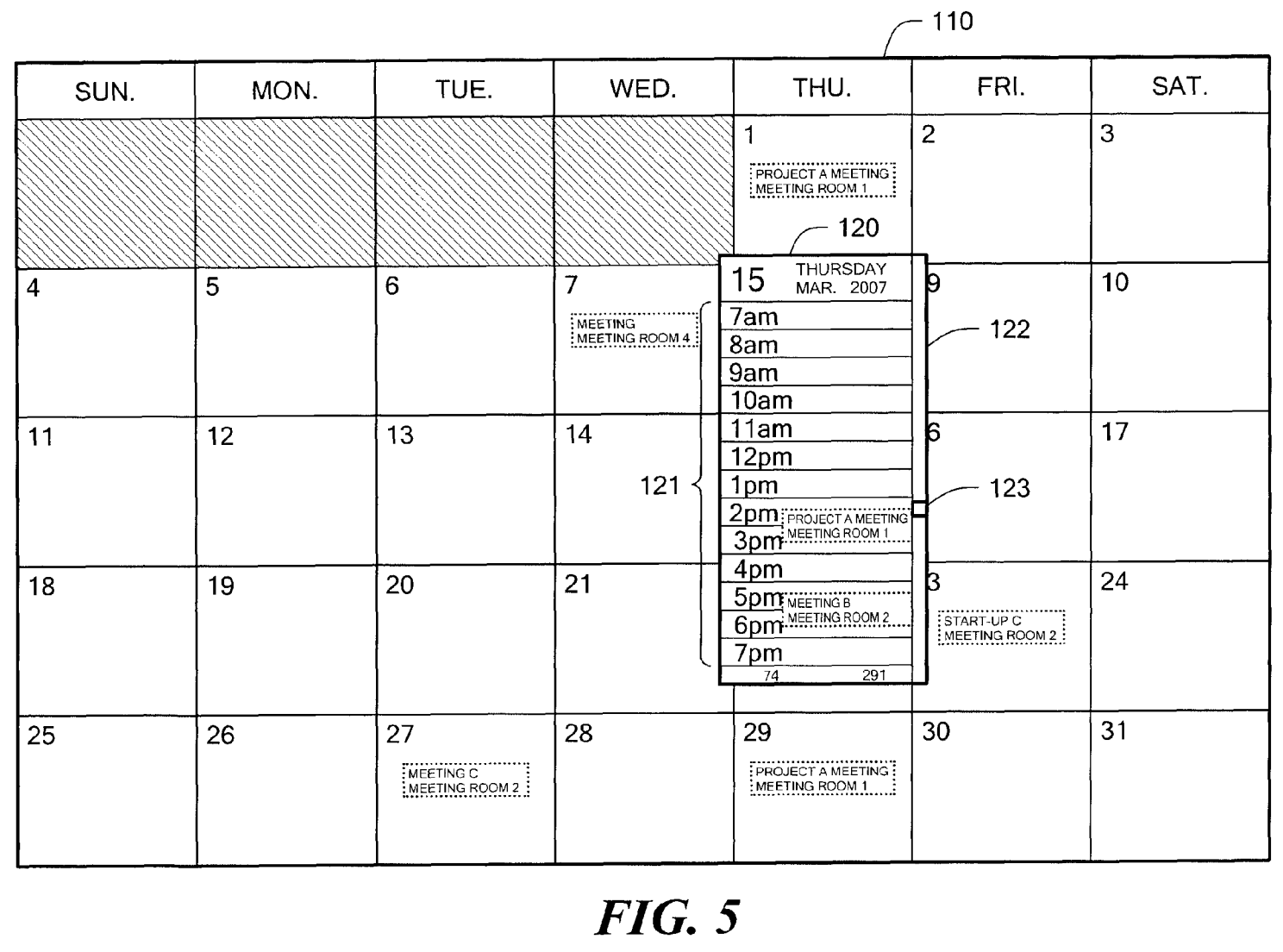

FIG. 5 is a diagram showing an aspect in which a daily view is overlaid on a monthly view in the display screen of the display unit 10j.

In FIG. 5, a daily view 120 is displayed with respect to the 15th day among the days displayed in a monthly view 110. The daily view 120 displays a date and the date's day of the week, and a schedule field 121 for 13 hours from 7 am to 7 pm. Note that the schedule field 121 is not partitioned for each hour and constitutes one display field as a whole. Lines partitioning each hour only provide guidelines for identifying the hour. Therefore, as shown in the diagram, schedules can be described in a manner that the schedules straddle the hour partition lines. The time interval (from the start time to the end time) corresponding to an individual schedule is displayed in a different color.

The size of the daily view 120 may arbitrarily be set according to such as the size of the display screen of the display unit 10j. However, since display control that changes the position of the daily view 120 according to the time periods displayed on the daily view 120 is performed as will be discussed later, the width of the daily view 120 is preferably similar to that of the monthly view 110.

The time periods displayed on the daily view 120 are changed by scrolling the daily view 120. In an example shown in FIG. 5, a scroll bar is provided on the right edge of the view, and the displayed time periods are changed by dragging a knob 123. The scrollable range may arbitrarily be set. For example, if the daily view 120 is overlaid on the monthly view 110, the scrollable range can be set to a range from 0 o'clock on the first day of the month concerned to 24 o'clock (12 pm) on the last day of the month. Thus, a schedule extending over two days can be displayed in the month concerned.

The daily view 120 may be scrolled in conjunction with a scroll wheel provided on a pointing device such as a mouse. Also, instead of the scroll bar, the daily view 120 may be provided with change buttons for changing the display range thereof.

Figure 6:
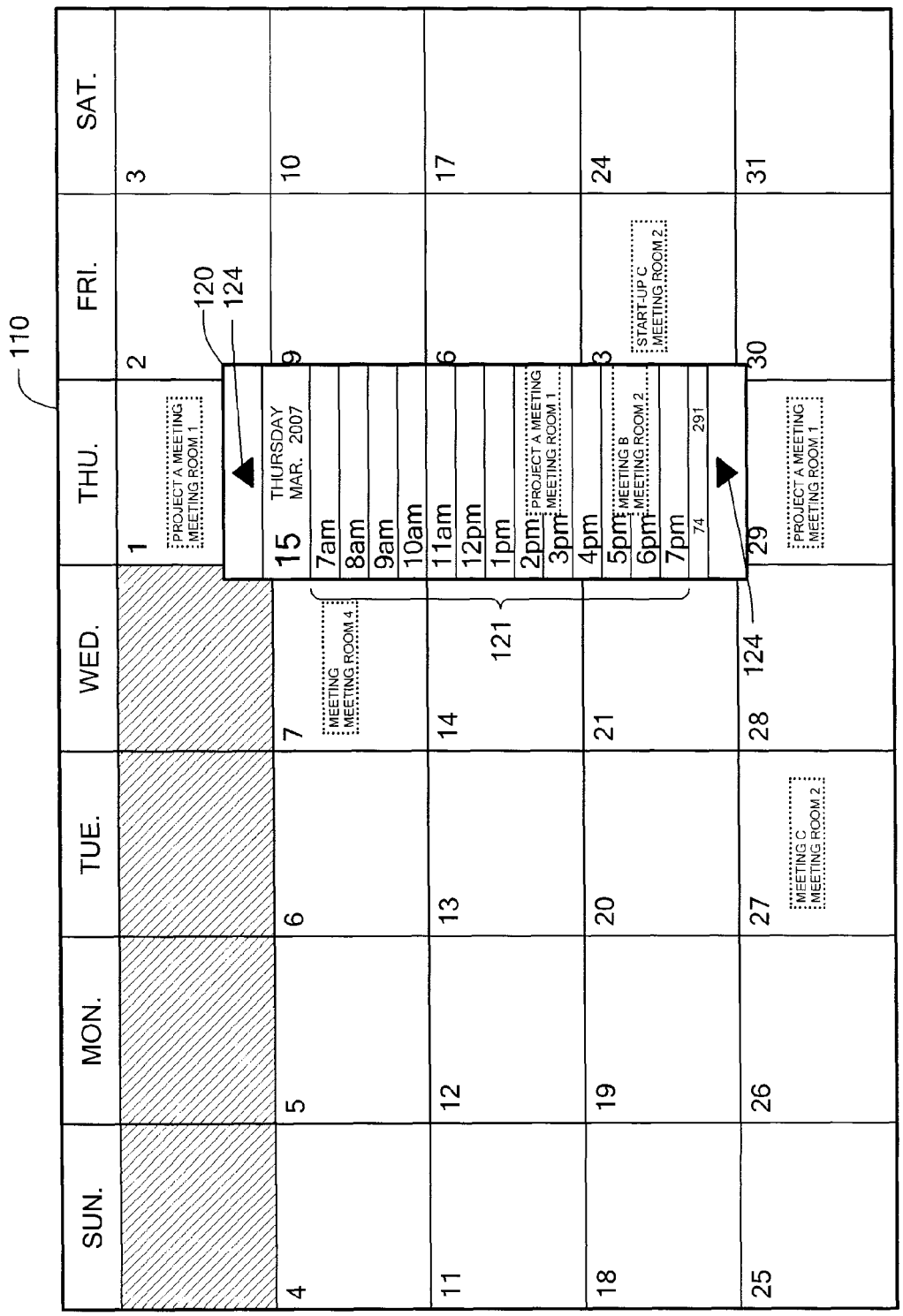
FIG. 6 a diagram showing an example of the daily view provided with change buttons instead of a scroll bar.

FIG. 6 a diagram showing an example of the daily view 120 provided with change buttons instead of the scroll bar 122.

By clicking on any one of change buttons 124 in the daily view 120 shown in FIG. 6, the displayed time periods are changed by one hour in the direction indicated by the clicked change button 124.

As shown in FIGS. 5 and 6, the daily view 120 is disposed in a manner that it is located on the corresponding date field (the 15th day in the illustrated example) in the monthly view 110. The width of the illustrated daily view 120 is similar to those of the individual date fields of the monthly view 110, while the length thereof is considerably larger than those of the individual date fields. Therefore, the daily view 120 is disposed in a manner that it is nearly matched with the corresponding date field in the transverse direction and in a manner than the corresponding date field is located near the center of the daily view 120 in the vertical direction.

The disposition of the daily view 120 shown in the diagrams is illustrative only, and other ways of disposition are not excluded. In practice, it is sufficient that the daily view 120 is disposed so that the relation between the daily view 120 and the corresponding date field of the monthly view 110 is intuitively understandable. For example, the daily view 120 may be displayed in a manner that the upper edge thereof is overlaid on the lower edge of the corresponding date field of the monthly view 110 so that the daily view 120 appears as if it were pulled down from the date field. Conversely, the daily view 120 may be displayed in a manner that the lower edge thereof is overlaid on the upper edge of the corresponding date field of the monthly view 110 so that the daily view 120 appears as if it were pulled up from the date field.

Here, consider a case where the displayed time periods are changed by operating the scroll bar 122 or any one of the change buttons 124 so that time periods of the next day (or previous day) are displayed.

This means that the daily view 120 corresponds to two date fields of the monthly view 110. In this embodiment, the display position of the daily view 120 is changed according to the ratio of the number of time periods of one of the two dates to the number of time periods of the other date in the time periods displayed in the daily view 120.

Figure 7A:
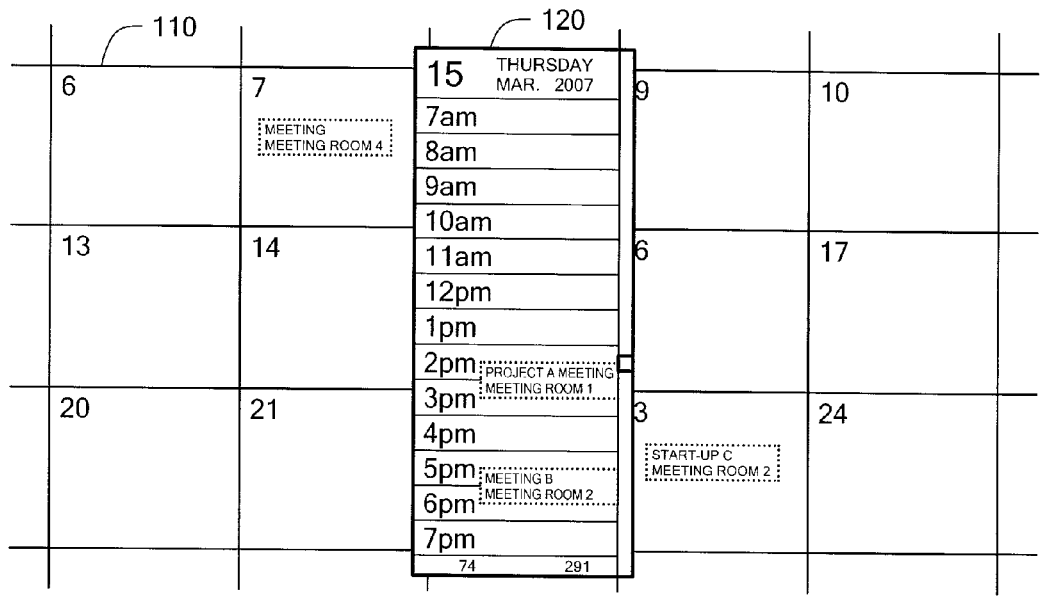
FIG. 7 is a diagram showing an aspect in which the display position of the daily view is changed according to the composition of time periods displayed in the daily view.
Figure 7B:
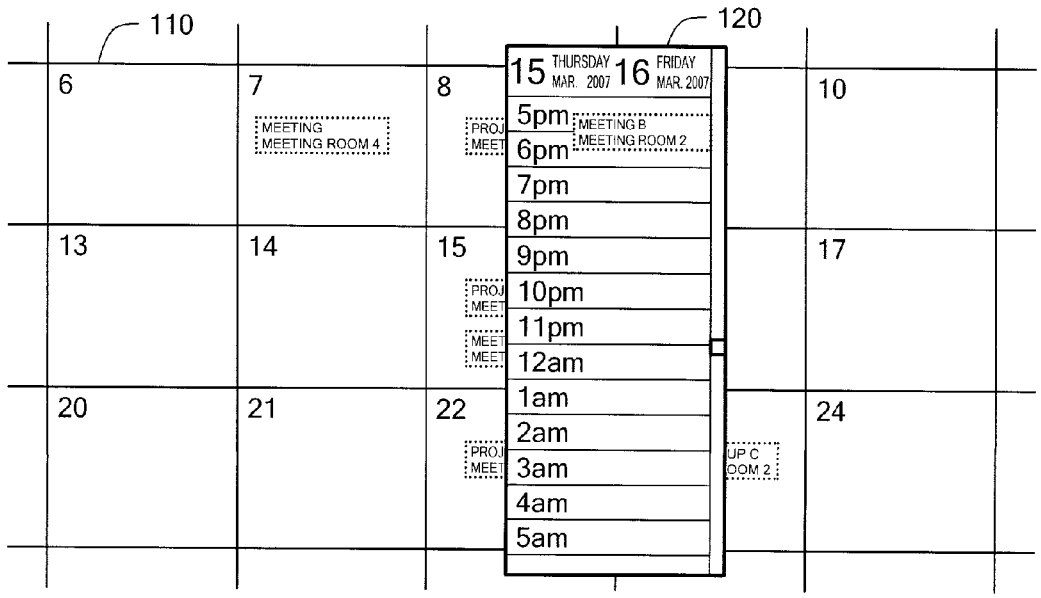
Figure 7C:
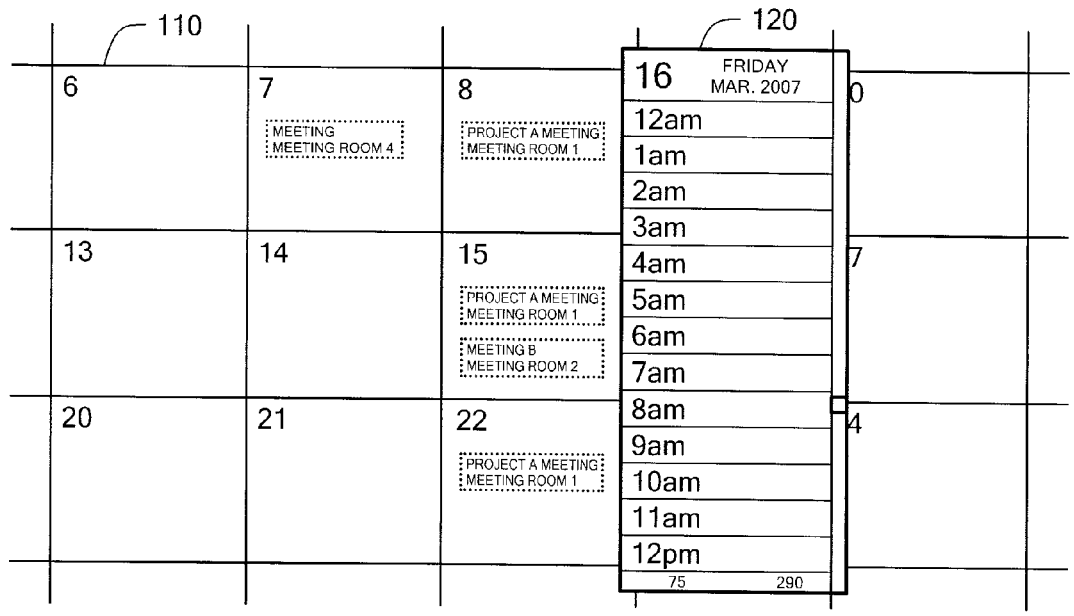

FIG. 7 is a diagram showing an aspect in which the display position of the daily view 120 is changed according to the composition of the time periods displayed in the daily view 120.

In example (a) of FIG. 7, the displayed time periods are all those of the 15th day; therefore, the daily view 120 is displayed in a manner that it is overlaid on the date field of the 15th day in the monthly view 110. In example (b) of FIG. 7, several time periods (five hours) are those of the 16th day; therefore, the display position of the daily view 120 is moved toward the date field of the 16th day in the monthly view 110. In example (c) of FIG. 7, the displayed periods are all those of the 16th day; therefore, the daily view 120 is displayed in a manner that it is overlaid on the date field of the 16th day in the monthly view 110.

The distance the above-mentioned daily view 120 travels is determined by the composition of the time periods displayed in the daily view 120. For example, as shown in example (a) of FIG. 7, if the schedule field 121 for 13 hours is displayed in the daily view 120, the distance between the position of the daily view 120 in example (a) of FIG. 7 and that in example (c) of FIG. 7 is divided into 13 equal parts. Then, each time the displayed time periods are changed by scrolling the daily view 120 and the number of time periods of the 16th day is increased in steps of one hour, the daily view 120 travels the 13 equal parts of the distance one by one toward its position in example (c) of FIG. 7. That is, the daily view 120 performs travel corresponding to one day by traveling the distance in 13 steps.

Heretofore, a case where the schedule field 121 for 13 hours is displayed in the daily view 120 and the displayed time periods are changed in steps of one hour has been described. However, the way the daily view 120 travels is not limited to that shown in this example. The number of equal parts of the distance the daily view 120 travels for one day may also be changed according to the length of the schedule field 121 displayed in the daily view 120. Further, the time periods displayed in the schedule field 121 may be changed in steps of 10 or 5 minutes and, accordingly, the number of equal parts of the distance the daily view 120 travels may be increased so as to change the display position of the daily view 120 in more stages.

The daily view 120 is allowed to travel, for example, by redrawing the daily view 120 each time the display position thereof is changed step by step. In this case, a visual effect as if the daily view 120 were moving smoothly is produced by performing moving picture processing such that the daily view 120 slides sideways between its original position and a position where it will be redrawn.

The time periods displayed in the daily view 120 are changed, for example, by operating the scroll bar 122, as described above. However, if the daily view 120 travels in conjunction with a change in the time periods displayed in the daily view 120, the cursor conceivably departs from the knob 123 of the scroll bar 122 in conjunction with the travel of the daily view 120. To address this problem, the cursor may also be redrawn together with the daily view 120.

As described above, this embodiment associates the composition of the time periods displayed in the daily view 120 with the display position of the daily view 120. For this reason, an operation has been described that moves the daily view 120 in conjunction with the change in the time periods displayed in the daily view 120. Conversely, the time periods displayed in the daily view 120 may be changed in conjunction with the movement of the daily view 120. Specifically, if the daily view 120 is moved such as by dragging it using a pointing device, the time periods displayed in the daily view 120 may be changed according to the position to which the daily view 120 has been moved.

Figure 8A:
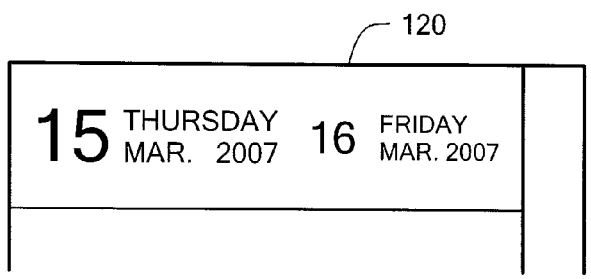
FIG. 8 is a diagram showing an example in which the display of dates in the daily view is controlled according to the display position of the daily view.
Figure 8B:
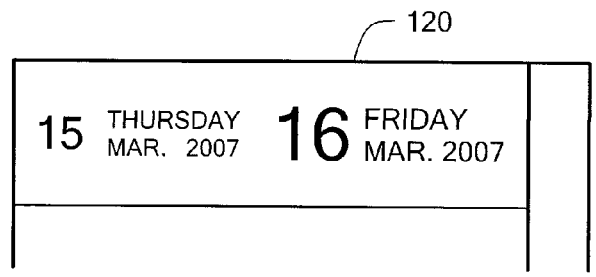

Incidentally, if the time periods displayed in the daily view 120 extends over the next day (or previous day) as shown in example (b) of FIG. 7, the daily view 120 may display two dates. In this case, for example, the display sizes of the two dates may be made different according to which of the numbers of the respective time periods of the previous and next days is larger, as shown in examples (a) and (b) of FIG. 8. In example (a) shown in FIG. 8, the date of the 15th day is displayed in a larger size since the number of the time periods of the 15th day is larger. In example (b) shown in FIG. 8, the date of the 16th day is displayed in a larger size since the number of the time periods of the 16th day is larger. Performing such display control allows the user to intuitively and easily recognize which date's time periods are displayed in a larger number in the daily view 120 by checking the display of the dates.

Display Control in Special Case

Here, consider a case where the daily view 120 corresponding to a Saturday (e.g., the 17th day in FIG. 5) in the monthly view 110 is displayed and the displayed time periods are changed to include time periods of the next day. This means that the time periods displayed in the daily view 120 extend not only over a different day but also over a different week. Since the different week lies in a different row in the monthly view 110, the daily view 120 cannot be simply moved. Hereafter, a method for displaying the daily view 120 in such a case will be described.

FIG. 9 is a display example in a case where the time periods displayed in the daily view 120 extend over multiple dates that belong to different weeks.

In an example shown in FIG. 9, daily views 120 each displaying only the time periods related to each date are displayed in the positions of the corresponding dates (17th day and 18th day) in the monthly view 110.

Figure 10:
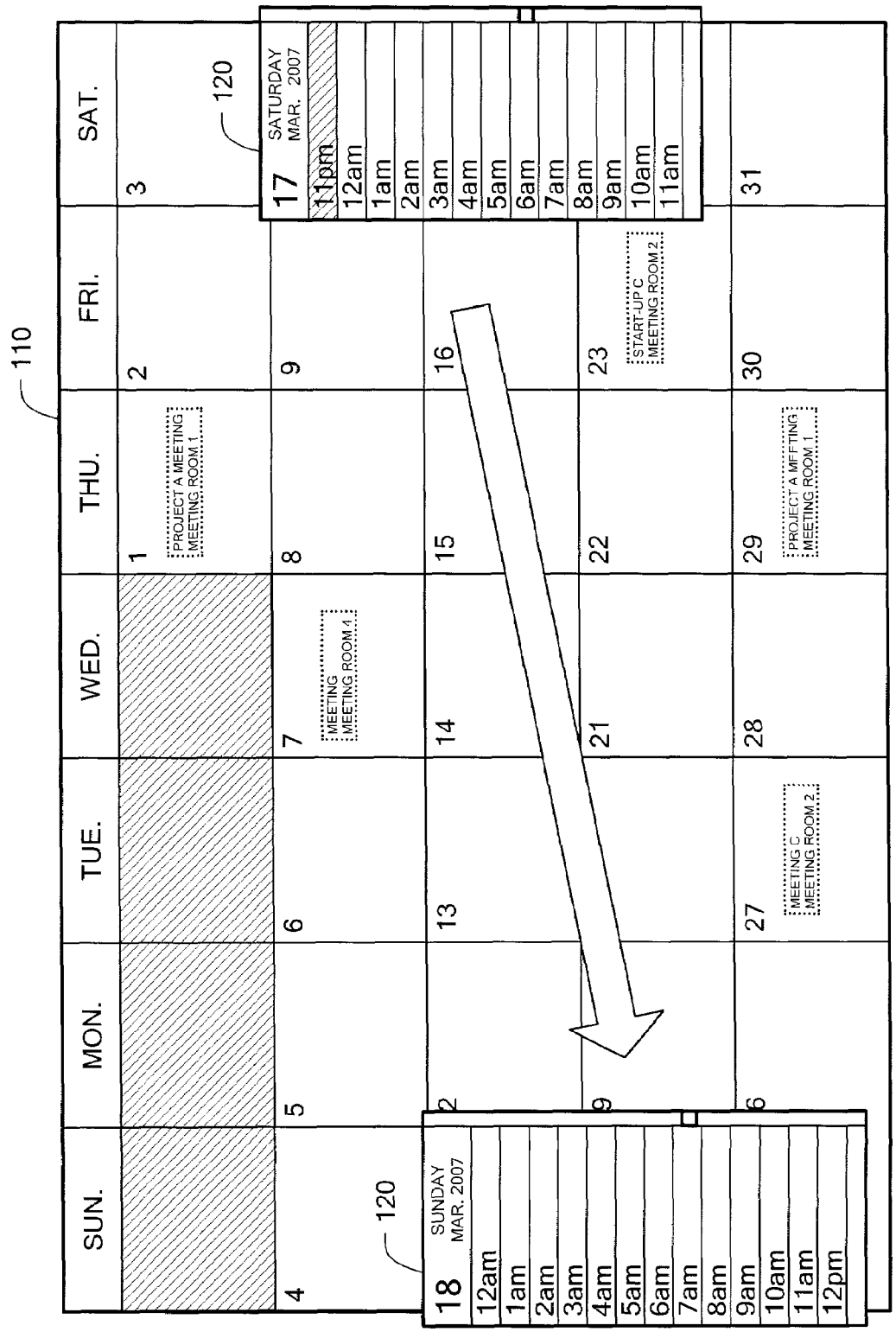
FIG. 10 is a diagram showing another display example in a case where the time periods displayed in the daily view cover multiple dates that belong to different weeks.

FIG. 10 is another display example in a case where the time periods displayed in the daily view 120 extend over multiple dates that belong to different weeks.

In an example shown in FIG. 10, the daily view 120 is displayed in the position of the previous date (17th day) while the time period (a gray portion) of the previous day is displayed, and once only the time periods of the next date (18th day) have been displayed in the daily view 120, the daily view 120 is moved to the position of the next date.

Figure 11:
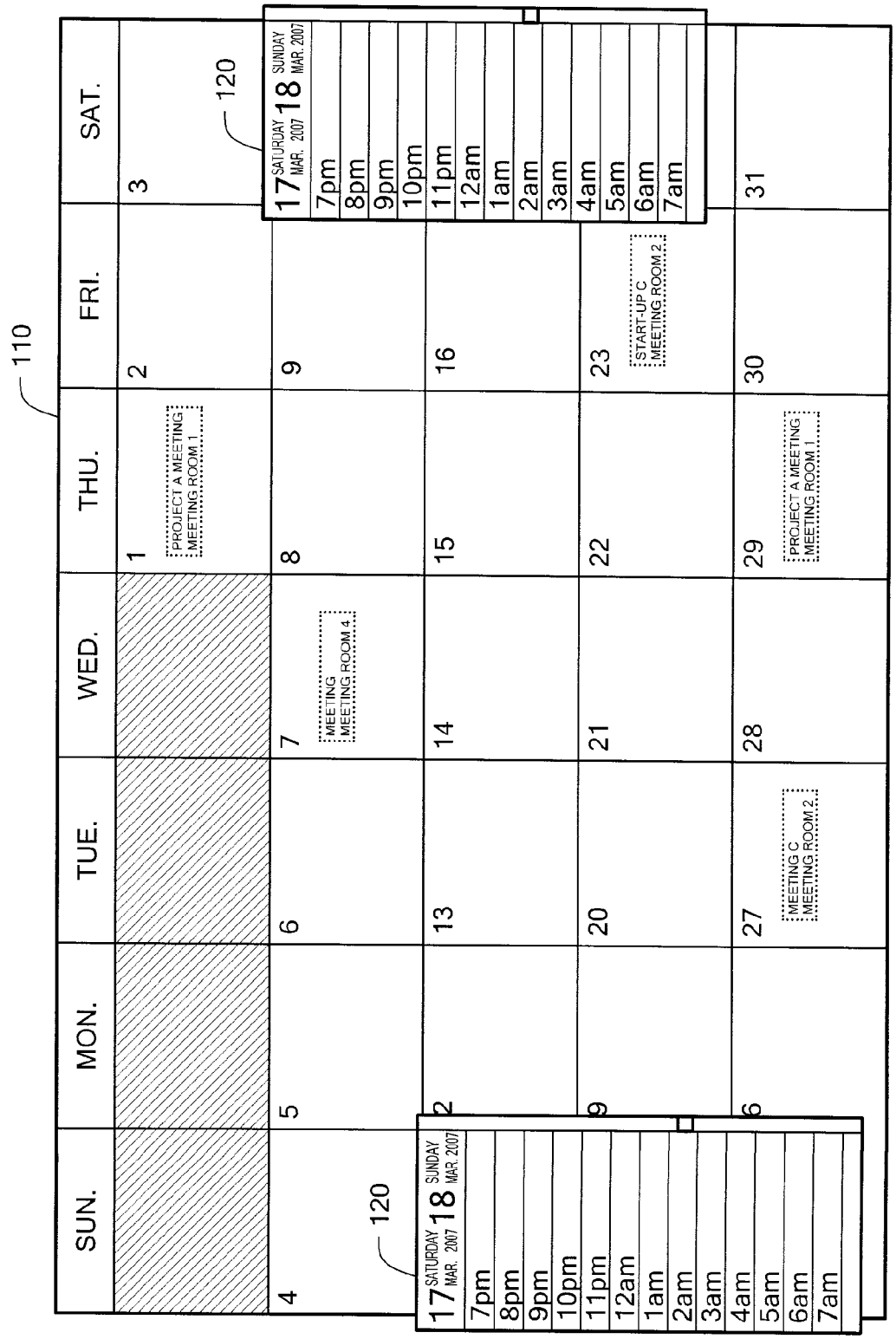
FIG. 11 is yet another display example in a case where the time periods displayed in the daily view cover multiple dates that belong to different weeks.

FIG. 11 is yet another display example in a case where the time periods displayed in the daily view 120 extend over multiple dates that belong to different weeks.

In an example shown in FIG. 11, an identical daily view 120 displaying the respective time periods of the dates is displayed in each of the positions of the dates (17th day and 18th day) in the monthly view 110.

According to the above-mentioned display methods, the daily view 120 is displayed so that the user intuitively understands to which date in the monthly view 110 the displayed daily view 120 corresponds. The above-mentioned display methods are illustrative only, and other display methods may be employed. Also, the display method may be optionally changed among the above-mentioned display methods, without being limited to any one of them.

Schedule Display Operations

Schedule display operations performed by the display control unit 12 will now be described.

Figure 12:
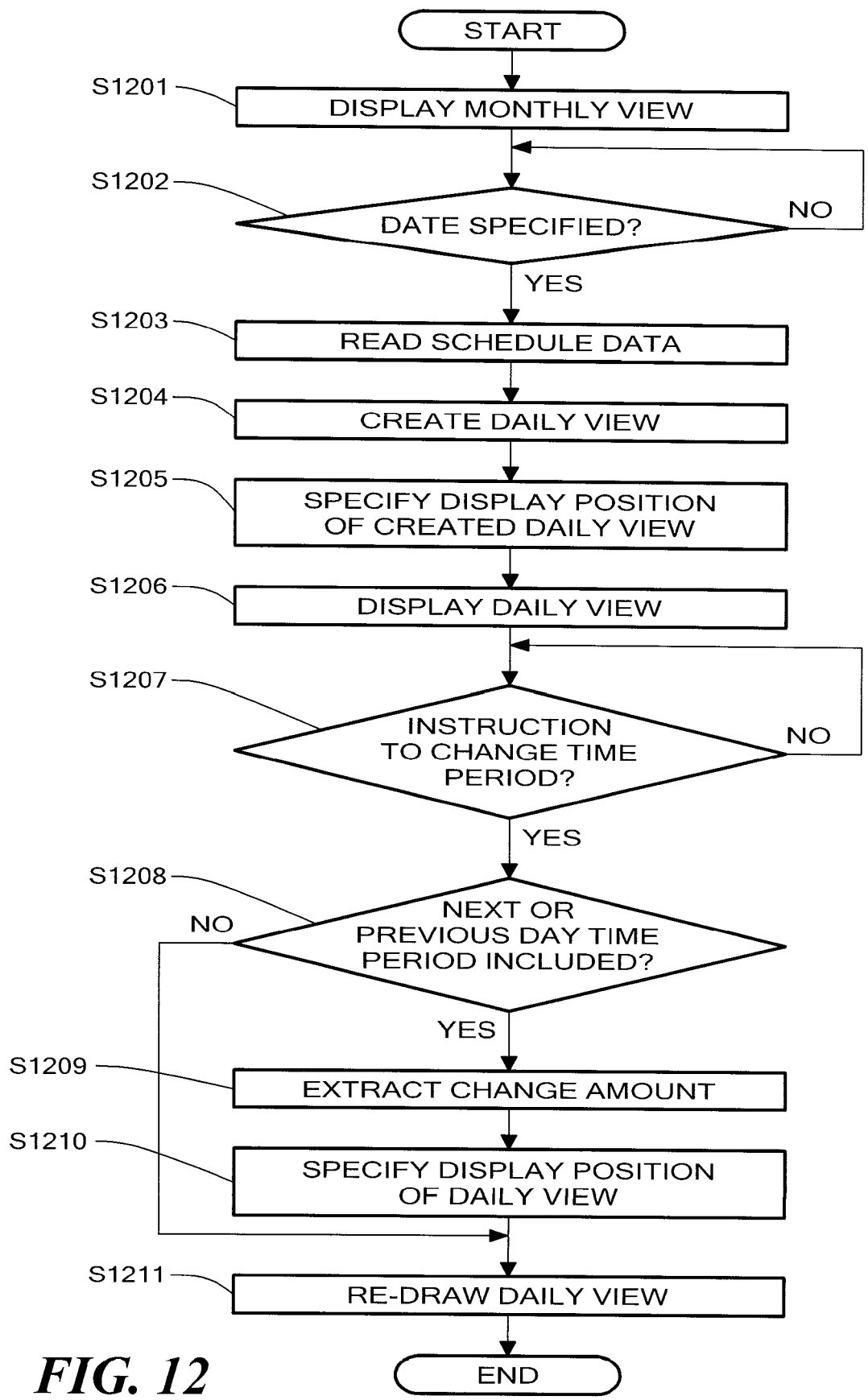
FIG. 12 is a flowchart showing operations performed by a display control unit according to this embodiment.

FIG. 12 is a flowchart showing operations performed by the display control unit 12.

As an initial operation, the monthly view 110 is displayed, for example, on the display unit 10j of the computer 10, under the control of the display control unit 12 (step S1201). Here, assume that display control performed over the monthly view 110 is similar to that performed by the related art schedule management function. For example, if an instruction for starting the schedule management function and a specification about the display format are inputted into the computer 10 according to a user operation, the display control unit 12 reads necessary information (calendar data and schedule data) from the storage unit 11 according to the instruction and specification. Then, the display control unit 12 causes the view creation unit 13 to create a view in the specified display format according to the read information, and then causes the display unit 10j to display the created view.

If an operation for specifying a specific date field (date) is performed in the displayed monthly view 110 (step S1202), the event extraction unit 14 extracts this operation as an event for instructing display of the daily view 120. Then, the display control unit 12 reads schedule data on the specified date from the storage unit 11 (step S1203) and then causes the view creation unit 13 to create the daily view 120 (step S1204). Then, the display control unit 12 specifies the display position of the daily view 120 on the monthly view 110 (step S1205) and causes the display unit 10j to display the daily view 120 created by the view creation unit 13 (step S1206).

Here, the operation extracted by the event extraction unit 14 refers to placement of the cursor on a specific date field of the monthly view 110, clicking of the cursor with the cursor placed on a specific date field, and the like. If schedule data read from the storage unit 11 when the monthly view 110 is displayed as an initial operation is cached, the schedule data need not be read in step S1203 again. It is sufficient to use the cached schedule data. As described above, the daily view 120 is overlaid on the corresponding date field in the monthly view 110.

Next, if an instruction for changing the time periods (displayed time periods) displayed in the daily view 120 being displayed is performed (step S1207), the event extraction unit 14 extracts this operation. Then, the display control unit 12 determines whether or not the displayed time periods have come to include time periods of the next or previous day according to the performed change instruction (step S1208). If any time period of the next or previous day is not included (that is, if the displayed time periods do not extend over two days), the daily view 120 displaying the changed time periods is redrawn on the display unit 10j (step S1211).

On the other hand, if the displayed time periods have come to include time periods of the next or previous day due to the performed change in time periods, the display control unit 12 extracts the amount of change in time periods according to the contents of the performed operation (step S1209). Then, the display control unit 12 specifies a new display position of the daily view 120 according to the extracted change amount (step S1210), and redraws the daily view 120 displaying the changed time periods, in the specified display position (step S1211).

The operation extracted by the event extraction unit 14 here refers to an operation of the scroll bar 122 included in the daily view 120, a click of any one of the change buttons 124, an operation of the scroll wheel, or the like, as described above. A new position in which the daily view 120 is displayed is a position that extends over the next or previous day according to the composition of the time periods to be displayed after the change.

Other Embodiments

In the above-mentioned embodiment, a case has been described where the daily view 120 is displayed with respect to a specific date in the monthly view 110. Instead, the daily view 120 may be displayed with respect to a specific date in a weekly view or with respect to a specific date in a yearly view. Also, a weekly view may be displayed with respect to a specific week in a monthly view or in a yearly view. If a weekly view is displayed, for example, in a manner that the schedule fields of the days of the week are arranged in the transverse direction, the weekly view may be made scrollable in the transverse direction and, for example, display control may be performed such that the day being displayed is changed on a daily basis and the display position of the weekly view is changed according to the day being displayed. Incidentally, a weekly view may be displayed according to the weeks (Sunday to Saturday, Monday to Sunday, etc.) in the monthly view 110. Or several days prior to a predetermined day and several days subsequent to the predetermined day (e.g., prior three days and subsequent three days, prior two days and subsequent four days, etc.) may be displayed as a weekly view.

Figure 13:
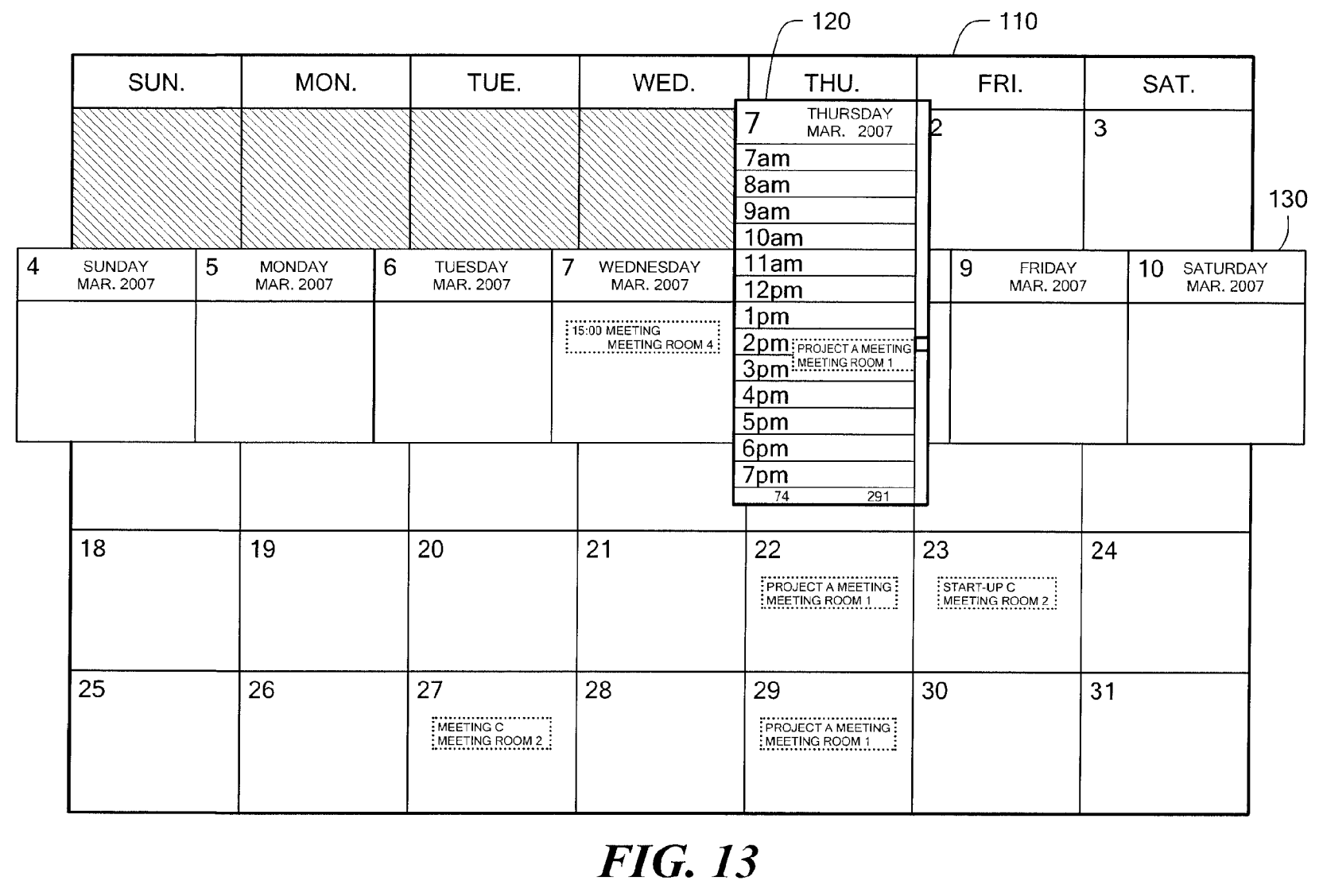

While the daily view 120 is displayed directly on the monthly view 110 in the above-mentioned embodiment, a weekly view may be first displayed on the monthly view 110 and then the daily view 120 may be displayed with respect to a specific date specified in the weekly view. FIG. 13 shows a display example of this case. In FIG. 13, the monthly view 110, the weekly view 130, and the daily view 120 are overlapped in this order and displayed.

While the above description regarding illustrative embodiments of the disclosed system includes examples of specific user interface operations and/or display objects, the disclosed system is not limited to these specific embodiments. Accordingly, the user interface objects provided herein may be modified as appropriate for various alternative embodiments, using various specific configurations of graphical buttons, menus, dialog boxes, and the like. Those skilled in the art will accordingly recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to embodiments of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); and/or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

I claim:

1. An apparatus comprising:
   at least one processor and a display unit;
   display control means for causing said display unit to display a monthly view created by a view creation means, wherein the monthly view displays more than one week, and to display, in at least one display position that is over and at least partially obscuring at least one part of the monthly view corresponding to a first date, a first daily view displaying time periods occurring within the first date;
   reception means for receiving an operation specifically directed to changing the time periods displayed in the first daily view,
   wherein the display control means, responsive to a first change in time periods displayed in the first daily view to extend over a second date belonging to a different week than the first date, additionally displays a second daily view that is separate and graphically distinct from the first daily view in a position over the corresponding second date in the monthly view, the second daily view displaying time periods occurring within the first date and the second date, wherein each of the first daily view and the second daily view includes a visual mechanism that enables the user to change time periods displayed in the first daily view and the second daily view respectively, and wherein in response to a second change in time periods causing the time periods displayed in the first daily view and second daily view to only include time periods within the second date, ceasing the display of the first daily view.

2. The apparatus according to claim 1, further comprising:
   wherein if the time periods displayed in the second view extend over multiple dates within the same week, the display control means displays the second view so that the second view extends over corresponding multiple dates in the first view according to the ratio of the number of time periods of one of the dates to the number of time periods of the other date in the time periods displayed in the second view.

3. The apparatus according to claim 1, further comprising:
   reception means for receiving an operation for changing a display position of the second view; and
   wherein if the second view is moved, the display control means changes time periods displayed in the second view according to a position of the moved second view.

4. A method for managing and displaying a schedule using a computer, comprising:
   (a) causing the computer to display, on a display unit, a monthly view, wherein the monthly view displays more than one week, and to display, in at least one display position that is over and at least partially obscuring at least one part of the monthly view corresponding to a first date, a first daily view displaying time periods occurring within the first date;
   (b) causing the computer to receive an operation specifically directed to changing the time periods displayed in the first daily view; and
   (c) responsive to a first change in time periods displayed in the first daily view to extend over a second date belonging to a different week than the first date, causing the computer to additionally display a second daily view that is separate and graphically distinct from the first daily view in a position over the corresponding second date in the monthly view, the second daily view displaying time periods occurring within the first date and the second date, wherein each of the first daily view and the second daily view includes a visual mechanism that enables the user to change time periods displayed in the first daily view and the second daily view respectively, and wherein in response to a second change in time periods causing the time periods displayed in the first daily view and the second daily view to only include time periods within the second date, ceasing the display of the first daily view.

5. The method according to claim 4, further comprising:
   wherein in step (c), if the time periods displayed in the second view are changed according to an operation received in step (b) and thus the time periods extend over multiple dates within the same week, the second view is displayed so that the second view extends over corresponding multiple dates in the first view according to the ratio of the number of time periods of one of the dates to the number of time periods of the other date in the time periods displayed in the second view.

6. A computer program product, comprising: a non-signal computer readable medium having program code stored thereon, the program code for executing on at least one processor in a computer system to cause the computer system to perform the steps of
   (a) displaying, on a display unit, a monthly view, wherein the monthly view displays more than one week, and to display, in at least one display position that is over and at least partially obscuring at least one part of the monthly view corresponding to a first date, a first daily view displaying time periods occurring within the first date;
   (b) receiving an operation specifically directed to changing the time periods displayed in the first daily view; and
   (c) responsive to a first change in time periods displayed in the first daily view to extend over a second date belonging to a different week than the first date, causing the computer to additionally display a second daily view that is separate and graphically distinct from the first daily view in a position over the corresponding second date in the monthly view, the second daily view displaying time periods occurring within the first date and the second date, wherein each of the first daily view and the second daily view includes a visual mechanism that enables the user to change time periods displayed in the first daily view and the second daily view respectively, and wherein in response to a second change in time periods causing the time periods displayed in the first daily view and the second daily view to only include time periods within the second date, ceasing the display of the first daily view.

7. A computer comprising:
   at least one processor, a display unit, and a memory having stored thereon program code executable on the processor, the program code comprising display control means for causing said display unit to display a monthly view created by a view creation means, wherein the monthly view displays more than one week, and to display, in at least one display position that is over and at least partially obscuring at least one part of the monthly view corresponding to a first date, a first daily view displaying time periods occurring within the first date;

reception means for receiving an operation specifically directed to changing the time periods displayed in the first daily view, wherein the display control means, responsive to a first change in time periods displayed in the first daily view to extend over a second date belonging to a different week than the first date, additionally displays a second daily view that is separate and graphically distinct from the first daily view in a position over the corresponding second date in the monthly view, the second daily view displaying time periods occurring within the first date and the second date, wherein each of the first daily view and the second daily view includes a visual mechanism that enables the user to change time periods displayed in the first daily view and the second daily view respectively, and wherein in response to a second change in time periods causing the time periods displayed in the first daily view and second daily view to only include time periods within the second date, ceasing the display of the first daily view.

8. The computer according to claim 7, further comprising:
wherein if the time periods displayed in the second view extend over multiple dates within the same week, the computer is caused to, as a function of the display control means, display the second view so that the second view extends over corresponding multiple dates in the first view according to the ratio of the number of time periods of one of the dates to the number of time periods of the other date in the time periods displayed in the second view.

9. The computer according to claim 7, further comprising:
reception means for receiving an operation for changing a display position of the second view; and
wherein if the second view is moved, the computer is caused to, as a function of the display control means, change time periods displayed in the second view according to a position of the moved second view.

10. The apparatus according to claim 1, further comprising:
wherein the display control means repositions the second view to a second display position over and at least partially obscuring part of the first view, according to the received change in the time periods displayed in the second view.

11. The method according to claim 4, further comprising:
wherein in step (c), if the time periods displayed in the second view are changed according to an operation received in step (b) and thus the time periods extend over multiple dates within the same week, causing the computer to reposition the second view to a second display position that is over and at least partially obscuring part of the first view according to the received change in the time periods displayed in the second view.

12. The computer program product according to claim 6, further comprising:
wherein in step (c), if the time periods displayed in the second view are changed according to an operation received in step (b) and thus the time periods extend over multiple dates within the same week, repositioning the second view to a second display position that is over and at least partially obscuring part of the first view according to the received change in the time periods displayed in the second view.

13. The computer according to claim 7, further comprising:
wherein the computer is caused to, as a function of the display control means, responsive to the change in time periods causing the time periods displayed in the second view to extend over multiple dates belonging to the same week, reposition the second view to a second display position that is over and at least partially obscuring the first view according to the received change in the time periods displayed in the second view.

* * * * *